J. P. KASPER.
AUTO SIGNAL.
APPLICATION FILED APR. 7, 1917.
1,242,449.
Patented Oct. 9, 1917.
2 SHEETS—SHEET 1.
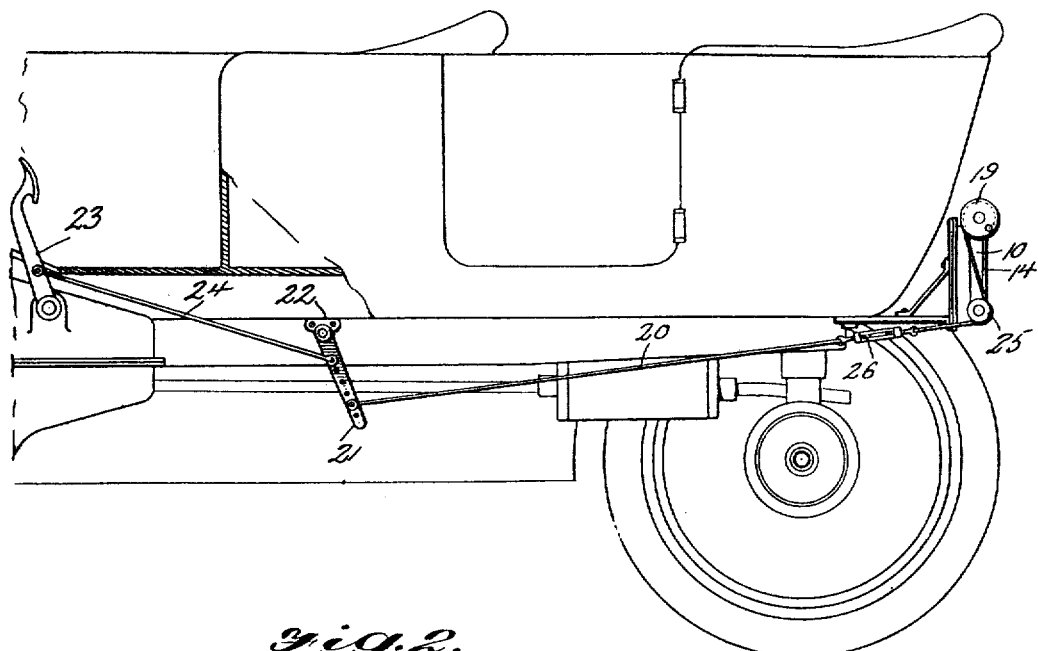
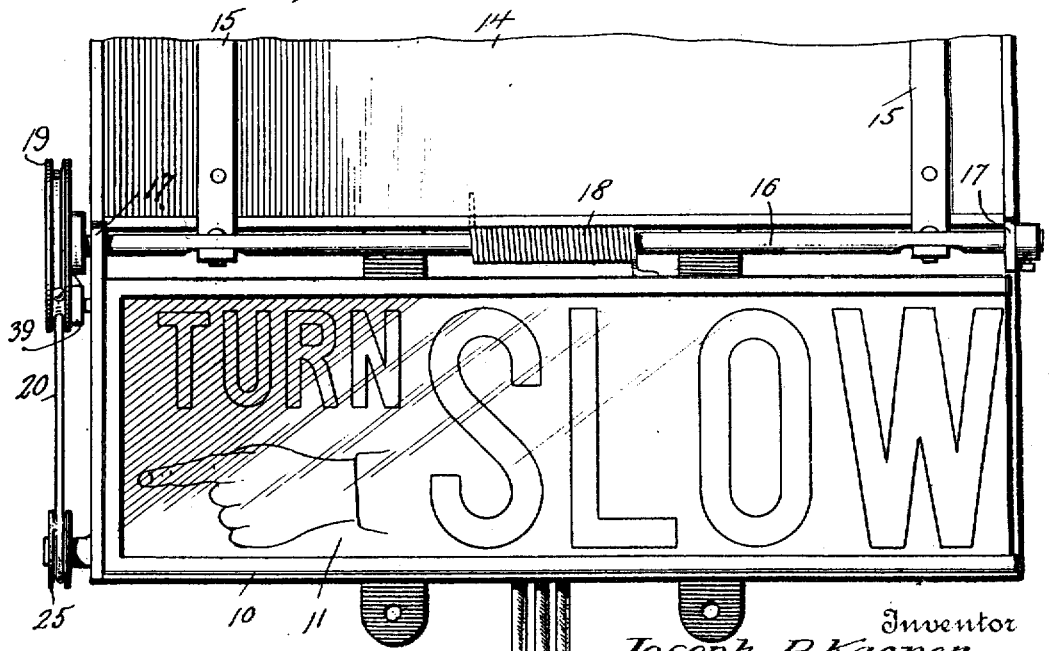
Inventor
Joseph P. Kasper

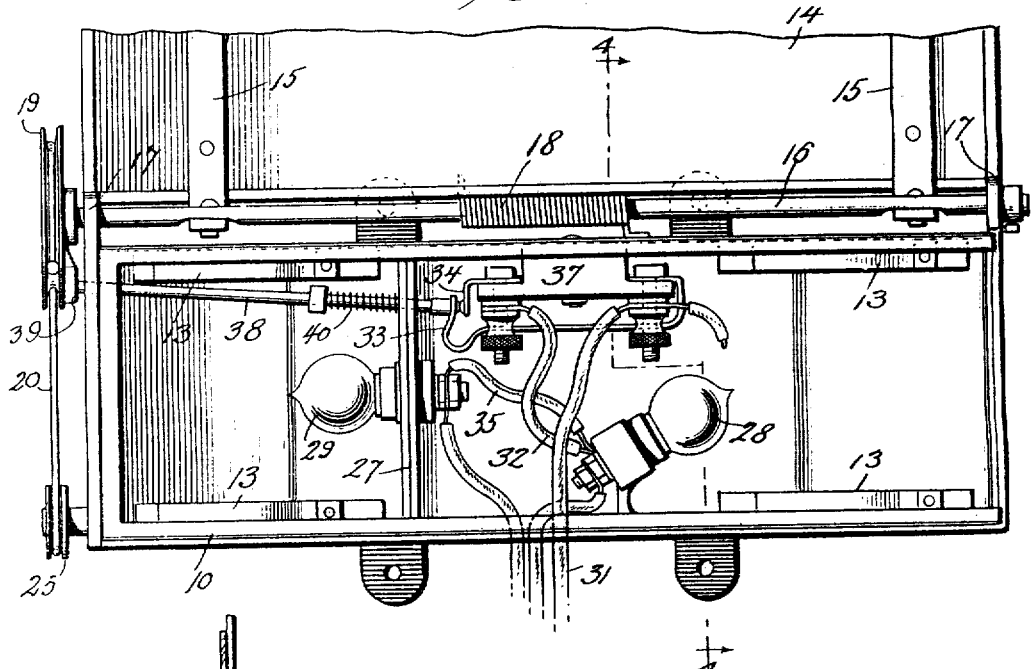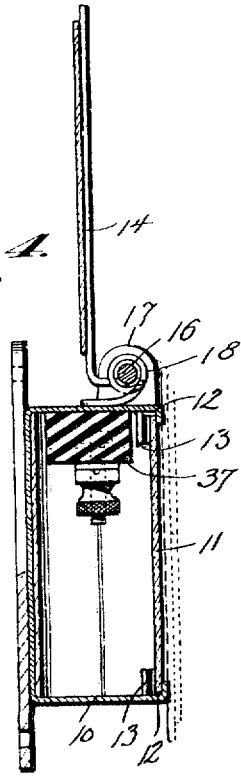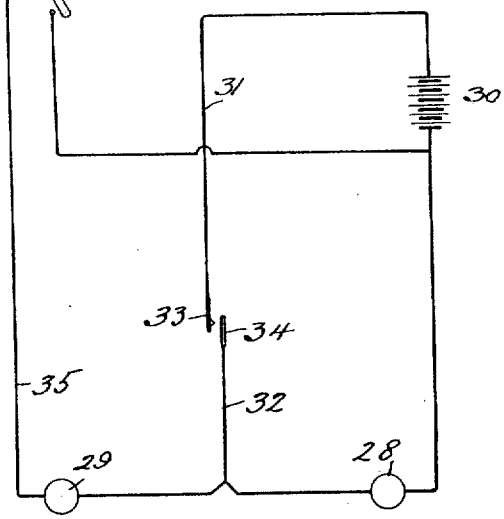

UNITED STATES PATENT OFFICE.

JOSEPH P. KASPER, OF HAMMOND, INDIANA.

AUTO-SIGNAL.

1,242,449.     Specification of Letters Patent.     Patented Oct. 9, 1917.

Application filed April 7, 1917. Serial No. 160,455.

*To all whom it may concern:*

Be it known that I, JOSEPH P. KASPER, a citizen of the United States, residing at Hammond, in the county of Lake and State of Indiana, have invented new and useful Improvements in Auto-Signals, of which the following is a specification.

The signal apparatus or device which is the subject matter of the present application for patent is designed more particularly for use in connection with automobiles and other motor vehicles to indicate the fact that the driver is about to make a turn or to bring the car to a stop, thus giving notice of the driver's intentions to the traffic behind the car.

The invention has for its object to provide a novel and improved visual signal device of the kind stated which is illuminated so that it is plainly visible after dark, and also to provide a novel and improved means for controlling the device as will be described in detail hereinafter.

In order that the invention may be better understood, reference is had to the accompanying drawings forming a part of this specification, and in said drawings, Figure 1 is a side elevation of a fragment of an automobile, partly in section, showing the application of the invention;

Fig. 2 is a face view of the visual signal or indicator in display position;

Fig. 3 is an elevation showing the interior of the device;

Fig. 4 is a cross-section on the line 4—4 of Fig. 3; and

Fig. 5 is a diagram showing the electric circuit.

In carrying out the invention there is provided a casing 10 made elongated as shown and having a glass or other transparent front 11, which latter seats in top and bottom channels 12 and is held in place by spring fingers 13. The glass is removable so that access to the interior of the casing may be had.

The glass front 11 forms a sign, it being suitably inscribed to display a warning. As shown in Fig. 2 the inscription consists of the words "Slow" and "Turn" and also the representation of a hand pointing to the left.

Normally, the sign 11 is covered by a shutter 14 and the inscription is therefore concealed. When the signal is to be displayed, the shutter is swung to uncover the sign, the shutter being fixed by arms 15 to a rock shaft 16 journaled in bearings 17 carried by the top of the casing 10 on the outside thereof. The shutter is swung to uncover the sign by rocking the shaft 16, and a coiled spring 18 connected to the shaft rocks the latter to swing the shutter down to cover the sign.

On one end of the rock shaft 16 is made fast a grooved pulley 19 over which is trained a line 20 made fast at one end to the pulley and having its other end fastened to a lever 21 supported by a suitable bracket member 22 mounted on the bottom of the car body beneath the latter. The casing 10 is supported in any suitable manner at the back of the car, with the sign 11 facing rearward. The brake pedal 23 of the car is connected by a line 24 to the lever 21, the connection being such that said lever is swung to pull on the line 20 when the brake of the car is applied. The line 20 being connected to the pulley 19, it will be evident that a pull on said line will cause the shaft 16 to rock, whereupon the shutter 14 swings upward to uncover the sign 11. Thus the signal is displayed upon application of the brake. If necessary, the line 20 may be trained over a suitably positioned guide pulley 25, this depending on the design of the car body. A turn buckle 26 interposed in the line 20 provides a convenient means for taking up slack in the same.

A partition 27 divides the casing 10 into two compartments in each of which is located an incandescent electric lamp, these lamps being shown at 28 and 29 respectively. The inscription "Slow" is in front of one of the lamps, and the inscription "Turn" and the hand are in front of the other lamp. The lamps obtain current from a suitable source 30.

From one side of the current source 30 a conductor 31 leads to one of a pair of switch members and from the other one of said pair of switch members, a conductor 32 leads to the other side of the current source, with the lamp 28 interposed in said conductor. These two switch members are composed of two spring tongues 33 and 34 which will be described in detail hereinafter. From the conductor 32 extends a branch circuit 35 in which is interposed the lamp 29 and also a switch 36 located within easy reach of the driver.

The spring tongues 33 and 34 are carried, inside the casing 10, by a block 37 of insulation, and they are normally separated. Upon bringing the tongue 33 in contact with the tongue 34, the circuit of the lamp 28 is closed, and when the switch 36 is closed, the lamp 29 is also cut in.

The switch tongue 33 is controlled by the movement of the shutter 14 through the following means:

In the casing 10 is slidably mounted a plunger 38, the same being supported in bearing apertures in the partition 27 and one of the end walls of the casing, from which wall the plunger projects into contact with the inner face of the pulley 19, said face having a cam 39. The plunger is so positioned that its inner end is close to or bears against the switch tongue 33, and it is held at its outer end in contact with the cam face of the pulley 19 by a spring 40. The cam is so located that it does not engage the plunger end when the shutter is down over the sign 11. When the shutter is swung to display the signal, the cam engages the plunger and pushes the same inward, and the plunger then establishes a contact between the switch members 33 and 34, whereupon the circuit of the lamp 28 is closed and the inscription "Slow" is illuminated. If the other inscription is to be illuminated also, the circuit of the lamp 29 is closed by operating the switch 36. When the shutter is allowed to drop to cover the sign, both lamp circuits are broken.

I claim:

1. A signal device for vehicles, comprising a casing bearing a signal inscription, a shutter movable to cover and uncover the inscription, means for operating the shutter, an electric lamp for illuminating the inscription, a switch controlling the lamp, a slidable member for actuating the switch, and means actuated by the shutter for operating the slidable member.

2. A signal device for vehicles, comprising a casing bearing a signal inscription, a shutter movable to cover and uncover the inscription, means for operating the shutter, an electric lamp for illuminating the inscription, a switch controlling the lamp, a slidable member for actuating the switch, and a cam operatively connected to the aforesaid shutter and engageable with the slidable member.

3. A signal device for vehicles, comprising a casing having a signal inscription, a shutter movable to cover and uncover the inscription, a rock shaft carrying the shutter, an electric lamp for illuminating the inscription, a switch controlling the lamp, a slidable member for actuating the switch, a cam on the rock shaft engageable with the slidable member for actuating the same, and means for actuating the rock shaft to operate the shutter.

In testimony whereof I affix my signature.

JOSEPH P. KASPER.

Copies of this patent may be obtained for five cents each, by addressing the "Commissioner of Patents, Washington, D. C."